US006978137B2

(12) United States Patent
Gwon et al.

(10) Patent No.: US 6,978,137 B2
(45) Date of Patent: Dec. 20, 2005

(54) AGGREGATION POINT PREDICTION MATCHING FOR COHERENT LAYER THREE SIGNALING AND FAST IP MOBILITY TRIGGERING

(75) Inventors: YoungJune L. Gwon, Mountain View, CA (US); Daichi Funato, Sunnyvale, CA (US); Atsushi Takeshita, Sunnyvale, CA (US)

(73) Assignee: NTT DoCoMo Inc., Tokyo (JP)

( * ) Notice: Subject to any disclaimer, the term of this patent is extended or adjusted under 35 U.S.C. 154(b) by 503 days.

(21) Appl. No.: 10/141,151

(22) Filed: May 8, 2002

(65) Prior Publication Data

US 2002/0168980 A1 Nov. 14, 2002

Related U.S. Application Data

(60) Provisional application No. 60/290,399, filed on May 11, 2001.

(51) Int. Cl.[7] .............................................. H04Q 7/20
(52) U.S. Cl. ...................... 455/436; 437/439; 370/331
(58) Field of Search ............................ 455/436, 432.1, 455/435.1, 437, 438, 442, 452.1, 439; 370/338, 370/331, 401, 352, 329

(56) References Cited

U.S. PATENT DOCUMENTS

| | | | |
|---|---|---|---|
| 6,574,473 B2 * | 6/2003 | Rinne et al. ................. | 455/436 |
| 6,647,261 B1 * | 11/2003 | Banerjee ...................... | 455/436 |
| 6,757,536 B1 * | 6/2004 | Kim et al. ................... | 455/436 |
| 6,768,726 B2 * | 7/2004 | Dorenbosch et al. ....... | 370/331 |
| 6,792,273 B1 * | 9/2004 | Tellinger et al. ............ | 455/442 |
| 6,832,087 B2 * | 12/2004 | Gwon et al. ................ | 455/436 |
| 2002/0131386 A1 * | 9/2002 | Gwon ......................... | 370/338 |
| 2003/0016655 A1 * | 1/2003 | Gwon ......................... | 370/352 |
| 2004/0090936 A1 * | 5/2004 | Cuny et al. ................. | 370/331 |

FOREIGN PATENT DOCUMENTS

| JP | 09-261711 | 10/1997 |
|---|---|---|
| JP | 10-276463 | 10/1998 |
| JP | 11-187452 | 7/1999 |

OTHER PUBLICATIONS

El Malki, K., Calhoun, P.R. Hiller, T., Kempf, J., McCann, P.J., Singh, A., Soliman, H. and Thalanany, S., "Low Latency Handoffs in Mobile IPv4," Feb. 23, 2001, http://www.ietf.org/internet-drafts/draft-ietf-mobileip-lowlatency-handoffs-v4-00.txt.

* cited by examiner

Primary Examiner—Joseph Feild
Assistant Examiner—Kamran Afshar
(74) Attorney, Agent, or Firm—Edward C. Kwok; MacPherson Kwok Chen & Heid LLP

(57) ABSTRACT

A method and system for providing a handoff trigger in a wireless communication system. A mobile handoff prediction is generated with a mobile node. At least one handoff prediction is generated with at least one access network within radio range of the mobile node. The mobile handoff prediction and the at least one network handoff prediction are transmitted to a network control server. A handoff is initiated if the mobile handoff prediction and a respective one of the at least one handoff predictions match.

38 Claims, 1 Drawing Sheet

AGGREGATION POINT PREDICTION MATCHING FOR COHERENT LAYER THREE SIGNALING AND FAST IP MOBILITY TRIGGERING

This application claims the benefit of U.S. Provisional Application Ser. No. 60/290,399 which was filed on May 11, 2001.

FIELD OF THE INVENTION

The present invention relates generally to mobile IP networks and more particularly, to providing fast handoffs in mobile IP networks that minimize disruptions for real-time applications.

BACKGROUND OF THE INVENTION

An IP layer handoff is the process during which the routing responsibility of a mobile node is handed over between designated mobility agents or access routers. In order to perform the handoff, a set of procedures must be executed as the mobile node moves from one access network or wireless cell to another. In order to provide uninterrupted services and continuous communication (e.g.—IP telephony), the performance of a handoff has to be evaluated with regard to short handoff interruption times and low packet loss rates.

In mobile-IP networks a mobile node can perform IP-layer handoffs between foreign agent subnets. Sometimes, the latency involved in these handoffs can be above the threshold required for the support of delay-sensitive or real-time applications. As such, a need exists for methods of achieving low-latency Mobile IP handoffs. Low-latency Mobile IP handoffs allow greater support for real-time services on a mobile access network by minimizing the period of service disruption caused by the delay in the Mobile IP registration process.

In Mobile IPv4 (IETF RFC 2002), two methods have been proposed to achieve low-latency Mobile IP handoffs under the scope of IETF Mobile IP Working Group, which are defined as Pre-Registration and Post Registration Handoffs. In the Pre-Registration handoff method, the mobile node is involved in the expected IP-layer handoff procedure. The network assists the mobile node in performing-an expected layer three (L3) handoff before it completes the corresponding layer two (L2) handoff by providing a special L2 signal known as L2 trigger.

The Post Registration handoff method proposes extensions to the Mobile IP protocol to allow the old foreign agent and new foreign agent to use information from L2 to set up bi-directional tunnels prior to the full Mobile IP registration process from the mobile node. Thus, a formal Mobile IP registration at the new point of attachment is postponed until the movement of the mobile node has completed. Bi-directional tunneling provides a fast establishment of service at the new point of attachment so that the effect of the handoff on real-time applications is minimized. However, the mobile node must still perform a formal mobile-IP registration with the foreign agent or a renewal of bi-directional tunnel sometime later.

The low latency Mobile IPv4 handoff methods propose handoff schemes where L3 handoffs are controlled or initiated by either a mobile node or an access network. Both of these schemes are founded on the hypothesis that the L3 handoff is initiated before the L2 handoff begins by utilizing L2 triggers. Both of these schemes are silent about how to initiate the L3 handoff before the L2 handoff begins. In other words, methods to achieve L2 trigger requirement are considered specific implementation issues that should stay out of working scope of the low latency Mobile IP. As such, a need exists for a method of providing a low latency handoff that initiates the L3 handoff before the L2 handoff begins.

SUMMARY OF THE INVENTION

A preferred embodiment of the present invention discloses a method for providing a handoff trigger in a cellular wireless specific data communication system. During operation, a mobile handoff prediction is generated with a mobile node. At least one handoff prediction is also generated with at least one access network within radio range of the mobile node. The mobile handoff prediction and the network predictions are then transmitted to a network controller, e.g. radio network controller (RNC) in cellular networks. A handoff is then initiated if the mobile handoff prediction matches a respective handoff prediction, which is defined herein as prediction matching.

In the preferred embodiment set forth above, the mobile handoff prediction as well as the network handoff prediction is created using at least one L2 parameter. The L2 parameter may be selected from a group of L2 parameters consisting of a pilot signal-to-noise or signal-to-interference ratio measurement, a frame error rate measurement, information retrieval from an active set, from a candidate set, and from a neighborhood set. The mobile prediction as well as the network handoff prediction may also be created using a detected pilot signal strength between the mobile node and a respective access network. It is noteworthy that the RNC, a distributed network controller present in cellular wireless access network, acts as a coherent entity serving as an aggregation point where multiple predictions are combined for homogeneous handoff decision.

In other preferred embodiments, the mobile handoff prediction and the network handoff prediction can be created using at least one L3 parameter. The L3 parameter is preferentially selected from a group of L3 parameters consisting of a per packet latency indication, a latency jitter indication, a packet loss indication and a quality of services protocol specific variable.

As set forth above, if the predictions from the mobile node and a respective access network match, then a handoff is initiated. In the preferred embodiment, the handoff is a L3 handoff. Once the L3 handoff has been initiated, an L2 handoff is initiated by the network control server. Ideally, the L3 handoff is completed after the L2 handoff has been completed.

Yet another preferred embodiment of the present invention discloses a handoff trigger for a wireless communication system. In this embodiment, a mobile node is connected to an access network that is operable to generate at least one mobile handoff prediction. At least one prospective access network within radio range of the mobile node is operable to generate an access network handoff prediction. A network control server is connected to the access network and each prospective access network. During operation, the mobile node transmits its mobile handoff predictions and the prospective access network transmits its handoff predictions to the network control server; wherein the network control server is operable to generate a handoff trigger to a predetermined prospective access network if the mobile handoff prediction matches a handoff prediction from a respective prospective access network.

The mobile handoff prediction and the network handoff prediction are preferentially created using at least one L2 parameter. The L2 parameter may be selected from a group of L2 parameters consisting of a pilot signal-to-noise ratio or signal-to-interference measurement, a frame error rate measurement, an active set, a candidate set and a neighborhood set. The mobile handoff prediction and the network handoff prediction may also be created using received pilot signal strengths between the mobile node and a respective access network.

In other preferred embodiments, the mobile handoff prediction and the network handoff prediction may be created using at least one L3 parameter. The L3 parameter is preferentially selected from a group of L3 parameters consisting of a per packet latency indication, a latency jitter indication, a packet loss indication and a quality of services protocol specific variable.

The handoff trigger that is generated by the network control server is a L3 handoff trigger, which causes an L3 handoff to begin. An L2 handoff is initiated after the L3 handoff trigger creates an L3 handoff. Once the L2 handoff is complete, the L3 handoff is completed. As such, this embodiment of the present invention also uses prediction matching to determine when an L2 handoff is imminent, thereby allowing the network control server to generate an L3 handoff trigger to initiate an L3 handoff before the L2 handoff begins for ideal low latency Mobile IP handoff case.

Further objects and advantages of the present invention will be apparent from the following description, reference being made to the accompanying drawings wherein preferred embodiments of the invention are clearly illustrated.

DETAILED DESCRIPTION OF THE PRESENT PREFERRED EMBODIMENTS

Figure 1:
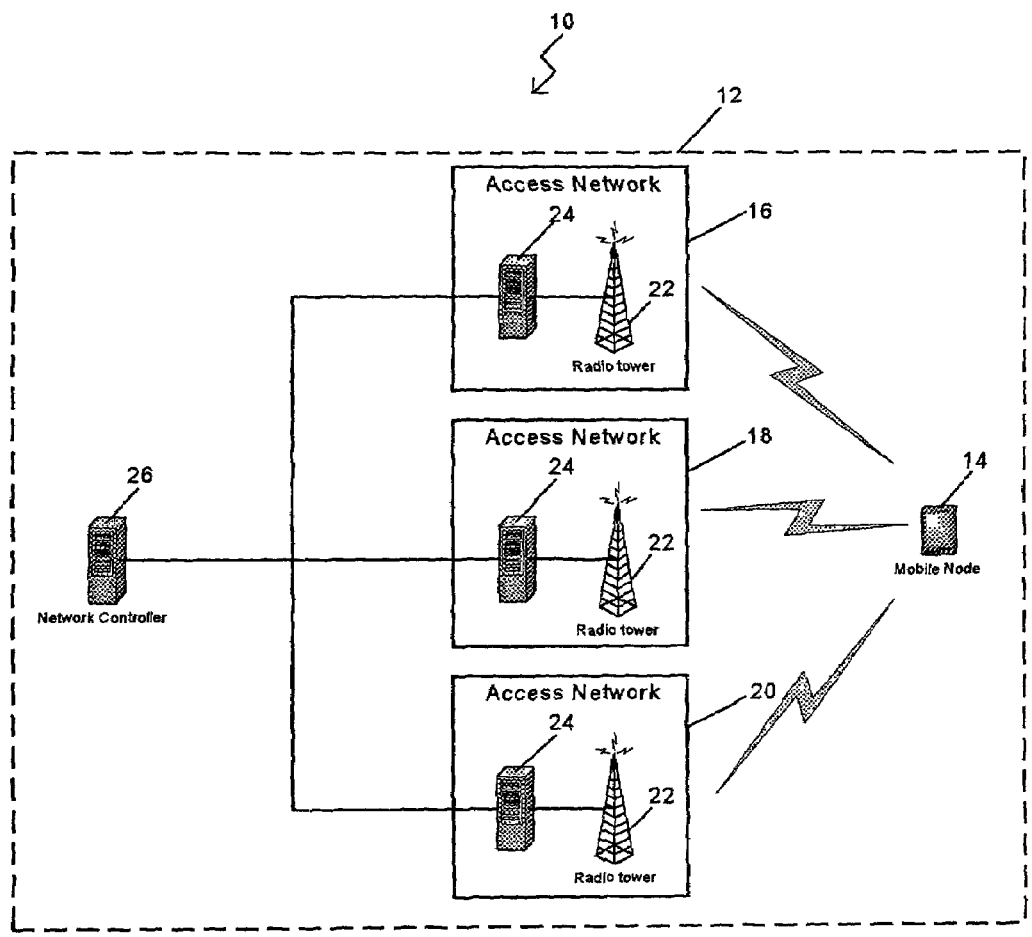
FIG. 1 illustrates a mobile-IP network that includes a mobile-IP triggering system.

Referring to FIG. 1, a preferred embodiment of the present invention discloses a Mobile IP handoff triggering system 10 for use in a Mobile IP network 12. As illustrated, the preferred Mobile IP network 12 includes a mobile node 14 that is connected to a plurality of base stations 16, 18, 20. Each base station 16, 18, 20 preferentially includes a radio tower 22 that is connected to an access network server 24. During operation, the radio towers 18 are used to send and receive radio signals to respective mobile nodes 14. As further illustrated in FIG. 1, each respective access network server 22 is connected to a network control server 26. It is assumed that access network server 22 is capable of Mobile IP foreign agent or access router functionalities. It is also assumed that network control server 26 is capable of distributed radio controller (e.g. RNC) that is usually located in cellular radio access network subsystems. The combination of the radio tower 22 and the access network server 24, which form base stations 16, 18, 20, can also be referred to herein as access networks.

Figure 2:
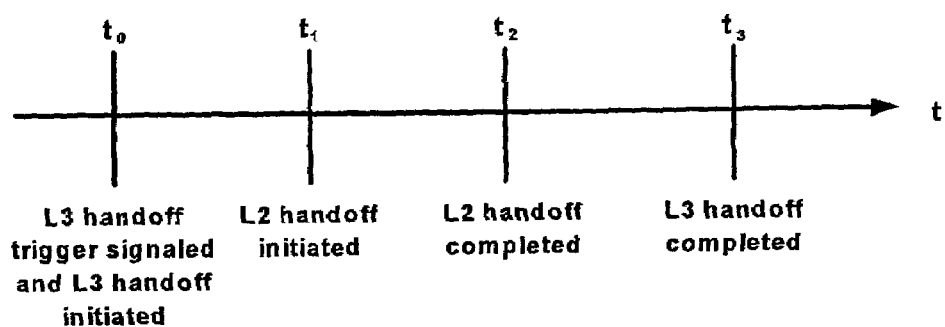
FIG. 2 illustrates a timing diagram for L2 and L3 handoff initiation and completion.

Referring to FIG. 2, in the preferred embodiment of the present invention an L3 handoff trigger is signaled and an L3 handoff is initiated a sufficient time before the L2 handoff is initiated. As used herein, the term L3 refers to the open systems interconnect layer 3 otherwise known as network layer that is used to route and deliver datagrams (preferably IP packets) based on logical address information. L3 relates to the communications protocol that contains the logical address of a client or mobile node 14. It is called the network layer and contains the address (IP, IPX, etc.) that is inspected by routers that forward datagrams through the network. L3 contains a type field so that traffic can be prioritized and forwarded based on message type as well as network destination. Since L3 provides more filtering capabilities, it also typically adds more overhead than L2 processing.

As used herein, the term L2 refers to the open systems interconnect layer 2 otherwise known as data link layer that is related to the communication protocol that contains the physical address of a client or mobile node 14. It contains the address inspected by a bridge or switch, as an example. Typically, L2 processing is faster than L3 processing, because less analysis of the packet at layer 3 is required. L2 consists of a medium access control (MAC) sublayer and a logical link control (LLC) sublayer. The MAC sublayer controls errors, admission, and channel access in transmission through the physical medium. The LLC sublayer provides an interface for higher level abstraction of L3 to lower level physical medium access control.

In the preferred embodiment of the present invention, an L2 handoff is first predicted. If it is predicted that an L2 handoff is imminent, an L3 handoff is triggered, thereby initiating the L3 handoff before the L2 handoff begins. As illustrated in FIG. 2, once the L3 handoff has been triggered upon anticipation of the L2 handoff. After the L2 handoff has been completed, the L3 handoff is expected to complete shortly after. In the preferred embodiment of the present invention, the time between the L2 handoff being completed and the L3 handoff being completed is maintained at a minimum, thereby providing fast IP mobility that minimizes disruptions to real-time applications.

Referring back to FIG. 1, in the preferred embodiment of the present invention at least one handoff parameter is used by the mobile node 14 and the base stations 16, 18, 20 to allow the network control server 26 to predict an L2 handoff. Preferentially, pilot signals are exchanged between the mobile node 14 and base stations 16, 18, 20 that are in radio range of the mobile node 14. Both uplink and downlink pilot channels are utilized between the mobile node 14 and the base stations 16, 18, 20. The pilot signals are used in the preferred embodiment to allow the network control server 26 to predict an L2 handoff.

For illustrative purposes only, suppose that the mobile node 14 is currently communicating with base station 16 and moving towards base stations 18, 20. The mobile node 14 would measure the strengths of the pilot signals from base stations 18, 20. As the mobile node 14 moves the strengths of the pilot signals the mobile node 14 receives from base stations 18, 20 will change. The mobile node 14, based on the changes in strengths of the pilot signals from surrounding base stations 18, 20, determines that a handoff from base station 16 to base station 18 is imminent and reports it to the network control server 26.

Each of the surrounding base stations 18, 20 also make the same determination based on changes of the strengths of the pilot signals from the mobile node 14 and reports it to the network control server 26 as well. Only when the mobile node 14 and some or all of the surrounding base stations 18, 20 agree that a handoff from base station 16 to base station 18 is imminent does the network control server 26 trigger or initiate an L3 handoff, which is illustrated in FIG. 1. The network control server 26 also determines, based on the reports from the mobile node 14 and the surrounding base stations 18, 20, a timing to initiate an L2 handoff from base station 18 to base station 20. At the determined timing, the network control server 26 authorizes the L2 handoff.

Although pilot signals are used in the preferred embodiment, other L2 parameters may be used for predicting L2 handoffs. Other handoff parameters that may be used to predict the L2 handoff include: pilot signal-to-interference ratio (SIR)—($E_c/I$) measurement (downlink/uplink), frame error rates (FER), latency; active set—caching may be required; candidate set—caching may be required; and neighborhood set (monitored set)—caching optional. An active set, as the term is used above, is used to refer to a list of base stations that the mobile node 14 is in active communication, exchanging not only control information but also having actual data channel set, during operation. A candidate set is used to refer to a list of base stations that could be potential candidates of becoming the next serving base station for the mobile node 14 based on its respective location and the current base station it is accessing. A neighbor set is used to refer to a list of base stations that the mobile node 14 can at least detect the presence in the physical or geographical proximity of the currently serving base station.

In another preferred embodiment of the invention, L3 parameters may be used for predicting L2 handoffs. L3 parameters that may be used include per packet latency indications, latency jitter indications, packet loss indications and quality of services (QoS) protocol specific variables. For instance, L2 handoffs can be predicted based on measured packet latencies, using the mobility prediction methods disclosed in U.S. patent applications Ser. No.: 09/770,544 entitled "Mobility Prediction in Wireless, Mobile Access Digital Networks" filed on Jan. 26, 2001 and U.S. patent application Ser. No.: 09/772,381 entitled "Fast Dynamic Route Establishment in Wireless, Mobile Access Digital Networks Using Mobility Prediction" filed on Jan. 29, 2001, naming Youngjune Lee Gwon as inventor, both of which are incorporated herein by reference in their entirety.

During operation the mobile node 14 predicts an L2 handoff, using an adaptive algorithm or other simpler algorithms, based on the detected handoff parameters and reports the prediction results to the network control server 26, which acts as an aggregation point for the prediction from the mobile node 14 and respective base stations 18, 20. In cellular access networks, the aggregation point could be a radio network controller (RNC). As set forth above, the handoff parameters may be selected from L2 prediction parameters or L3 prediction parameters. The prediction results are preferentially reported by the mobile node 14 to the network control server 26 using a radio control channel, which could be the common pilot channel (CPICH) in WCDMA networks.

Generally, an adaptive algorithm employs statistical processing of previously measured values to predict or iterate future values. More specifically, these algorithms can employ a least mean square (LMS) algorithm with error feedback to generate a minimum mean square error (MMSE) prediction of future value that is based on the present value and a number of previously measured values. The predictor preferentially has a form of linear (or non-linear depending on the characteristics of measured behaviors which can be determined by training before the actual prediction is performed) combination of present and past measured samples (i.e.—the measured strengths of pilot signals). At each iteration, coefficients that constitute the linear combination are adjusted in such a manner as to minimize a mean square error between the predicted value and the measured value. Note that the least mean squares algorithm is for exemplary purposes only as other predictors may be used in other preferred embodiments.

In another preferred embodiment the predictor may be a non-linear predictor that is in a quadratic form and or some other form. Other handoff parameters, such as a retransmission rate or a frame error correction rate, may be used to improve prediction accuracy. The past movement patterns of the mobile node 14 may be considered in predicting a future value. The pattern matching algorithms, which look to the past movement patterns, may also be used to improve prediction accuracy. The use of these parameters should be formulated such that the parameters are properly quantized when applied to computational routines.

After the mobile node 14 makes its prediction, the surrounding base stations (base stations 18, 20 in the example above) that are receiving uplink pilots from the mobile node 14 perform the same prediction. The base stations 18 and 20 preferentially use the same algorithm as the mobile node 14 and report the prediction results to the network control server 26 or some other equivalent aggregation point. Once all of the predictions values are received, the network control server 26 then compares the prediction results from the mobile node 14 and the base stations. If the prediction results form the mobile node 14 and the base stations agree to each other (prediction matching), then the network control server 26 communicates to a next foreign agent, the old foreign agent and the mobile node 14 a L3 handoff trigger (e.g.—sending a router advertisement of the next foreign agent to the mobile node 14).

As used above, the next foreign agent is used to refer to the foreign agent that the mobile node 14 will handoff to in the near future. The old foreign agent is used to refer to the foreign agent that currently serves the mobile node 14, from which the mobile node 14 will soon handoff to the next foreign agent. The preferred embodiment of the present invention discloses using aggregation point prediction matching to predict L2 handoff triggers that will occur in the near future. In the embodiments set forth above, the mobile node 14 and access networks both perform mobility prediction based on information available at L2 (by preferentially using pilot measurements that have occurred in physical layer or OSI layer 1) and the results are compared at a higher level hierarchy in the access network. If the predictions (performed by the mobile node and the access network) match, a fast IP mobility trigger is created and signaled to the mobile node 14, the next access network (base station) or foreign agent and the old access network (base station) or foreign agent.

While the invention has been described in its currently best-known modes of operation and embodiments, other modes, embodiments and advantages of the present invention will be apparent to those skilled in the art and are contemplated herein.

What is claimed is:

1. A method for providing a handoff trigger in a wireless communication system, comprising the steps of:
    generating a mobile handoff prediction in a mobile node;
    generating a network handoff prediction in an acces network within radio range of said mobile node;
    transmitting said mobile handoff prediction and said network handoff prediction to a network control server; and
    initiating a handoff if said mobile handoff prediction matches said network handoff prediction.

2. The method of claim 1, wherein said mobile handoff prediction is created using at least one L2 parameter.

3. The method of claim 2, wherein said L2 parameter may be selected from a group of L2 parameters consisting of a pilot signal-to-noise or signal-to-interference ratio measurement, a frame error rate measurement, information retrieval from an active set, from a candidate set and from a neighborhood set.

4. The method of claim 1, wherein said network handoff prediction is created using at least one L2 parameter.

5. The method of claim 4, wherein said L2 parameter may be selected from a group of L2 parameters consisting of a pilot signal-to-noise or signal-to-interference ratio measurement, a frame error rate measurement, information retrieval from an active set, from a candidate set and from a neighborhood set.

6. The method of claim 1, wherein said mobile prediction is created using a pilot signal strength between said mobile node and a respective access network.

7. The method of claim 1, wherein said network handoff prediction is created using a pilot signal strength between the access network and said mobile node.

8. The method of claim 1, wherein said mobile handoff prediction is created using at least one L3 parameter.

9. The method of claim 8, wherein said L3 parameter is selected from a group of L3 parameters consisting of a per packet latency indication, a latency jitter indication, a packet loss indication and a quality of services protocol specific variable.

10. The method of claim 1, wherein said network handoff prediction is created using at least one L3 parameter.

11. The method of claim 10, wherein said L3 parameter is selected from a group of L3 parameters consisting of a per packet latency indication, a latency jitter indication, a packet loss indication and a quality of services protocol specific variable.

12. The method of claim 1, wherein said handoff is a L3 handoff.

13. The method of claim 12, further comprising the step of initiating a L2 handoff after said L3 handoff is initiated in advance.

14. The method of claim 13, further comprising the step of completing said L3 handoff after said L2 handoff is complete.

15. A handoff trigger for a wireless communication system, comprising:
a mobile node connected to a first access network operable to generate a mobile handoff prediction;
a second access network within radio range of said mobile node operable to generate a network handoff prediction;
a network control server connected to said first access network and said second access network; and
wherein said mobile node transmits said mobile handoff prediction and said second access network transmits said handoff prediction to said network control server;
wherein said network control server is operable to generate a handoff trigger to the second access network if said mobile handoff prediction matches the network handoff prediction from the second access network.

16. The handoff trigger of claim 15, wherein said mobile handoff prediction is created using at least one L2 parameter.

17. The handoff trigger of claim 16, wherein said L2 parameter may be selected from a group of L2 parameters consisting of a pilot signal-to-noise ratio measurement, a frame error rate measurement, an active set, a candidate set and a neighborhood set.

18. The handoff trigger of claim 15, wherein said network handoff prediction is created using network L2 parameter.

19. The handoff trigger of claim 18, wherein said L2 parameter may be selected from a group of L2 parameters consisting of a pilot signal-to-noise or signal-to-interference ratio measurement, a frame error rate measurement, information retrieval from an active set, from a candidate set and from a neighborhood set.

20. The handoff trigger of claim 15, wherein said mobile prediction is created using a pilot signal strength between said mobile node and a respective access network.

21. The handoff trigger of claim 15, wherein said network handoff prediction is created using a pilot signal strength between the second access network and said mobile node.

22. The handoff trigger of claim 15, wherein said mobile handoff prediction is created using at least one L3 parameter.

23. The handoff trigger of claim 22, wherein said L3 parameter is selected from a group of L3 parameters consisting of a per packet latency indication, a latency jitter indication, a packet loss indication and a quality of services protocol specific variable.

24. The handoff trigger of claim 15, wherein said network handoff prediction is created using at least one L3 parameter.

25. The handoff trigger of claim 24, wherein said L3 parameter is selected from a group of L3 parameters consisting of a per packet latency indication, a latency jitter indication, a packet loss indication and a quality of services protocol specific variable.

26. The handoff trigger of claim 15, wherein said handoff trigger is a L3 handoff trigger.

27. The handoff trigger of claim 26, wherein an L2 handoff is initiated after said L3 handoff trigger creates an L3 handoff.

28. A method for providing a handoff trigger in a wireless communication system, comprising the steps of
generating a mobile handoff prediction in a mobile node;
generating a network handoff prediction with an access network within radio range of said mobile node;
transmitting said mobile handoff prediction and said network handoff prediction to a network control server;
initiating an L3 handoff trigger with said network control server if said mobile handoff prediction and said network handoff prediction match.

29. The method of claim 28, wherein said mobile handoff prediction is created using at least one L2 parameter.

30. The method of claim 29, wherein said L2 parameter may be selected from a group of L2 parameters consisting of a pilot signal-to-noise or signal-to-interference ratio measurement, a frame error rate measurement, information retrieval from an active set, from a candidate set and from a neighborhood set.

31. The method of claim 28, wherein said network handoff prediction is created using network L2 parameter.

32. The method of claim 31, wherein said L2 parameter may be selected from a group of L2 parameters consisting of a pilot signal-to-noise or signal-to-interference ratio measurement, a frame error rate measurement, information retrieval from an active set, from a candidate set and from a neighborhood set.

33. The method of claim 28, wherein said mobile prediction is created using a pilot signal strength between said mobile node and a respective access network.

34. The method of claim 28, wherein said network handoff prediction is created using a pilot signal strength between the access network and said mobile node.

35. The method of claim 28, wherein said mobile handoff prediction is created using at least one L3 parameter.

36. The method of claim 28, wherein said network handoff prediction is created using at least one L3 parameter.

37. The method of claim 28, further comprising the step of initiating a L2 handoff after said L3 handoff is initiated in advance.

38. The method of claim 37, further comprising the step of completing said L3 handoff after said L2 handoff is complete.

* * * * *